(12) United States Patent
Stoehling et al.

(10) Patent No.: US 8,884,477 B2
(45) Date of Patent: Nov. 11, 2014

(54) ELECTRIC MOTOR DRIVE, IN PARTICULAR FAN DRIVE

(71) Applicant: Brose Fahrzeugteile GmbH & Co. KG, Wuerzburg, Wuerzburg (DE)

(72) Inventors: Marco Stoehling, Schondra (DE); Karl-Heinz Bauer, Grossheirath (DE); Michael Rueb, Wuerzberg (DE); Frank Wittstadt, Sommerach (DE); Hannelore Diller, Rottendorf (DE); Peter Tiemeyer, Wuerzburg (DE)

(73) Assignee: Brose Fahrzeugteile GmbH & Co. Wuerzburg, Wuerzburg (DE)

( * ) Notice: Subject to any disclaimer, the term of this patent is extended or adjusted under 35 U.S.C. 154(b) by 0 days.

(21) Appl. No.: 13/728,440

(22) Filed: Dec. 27, 2012

(65) Prior Publication Data

US 2013/0113309 A1    May 9, 2013

Related U.S. Application Data

(63) Continuation of application No. 13/163,237, filed on Jun. 17, 2011, now Pat. No. 8,421,283, which is a continuation of application No. PCT/DE2009/001777, filed on Dec. 16, 2009.

(30) Foreign Application Priority Data

Dec. 17, 2008  (DE) .......................... 10 2008 062 432

(51) Int. Cl.
*H02K 5/24*     (2006.01)
*H02K 5/16*     (2006.01)

(52) U.S. Cl.
CPC ............... *H02K 5/24* (2013.01); *Y10S 277/916* (2013.01)
USPC ................ 310/51; 310/90; 277/916; 384/206

(58) Field of Classification Search
USPC .......................... 310/51, 90; 384/204, 206, 192
See application file for complete search history.

(56) References Cited

U.S. PATENT DOCUMENTS

| | | | |
|---|---|---|---|
| 3,720,852 A | 3/1973 | Vieweg et al. |
| 3,816,782 A | 6/1974 | Dow et al. |
| 3,935,489 A | 1/1976 | Church et al. |
| 4,598,220 A | 7/1986 | Stone |
| 4,639,193 A | 1/1987 | Reichert et al. |
| 4,641,979 A | 2/1987 | Stone |
| 4,711,590 A | 12/1987 | Lakin |
| 4,783,608 A | 11/1988 | Gruber et al. |
| 4,887,916 A | 12/1989 | Adam et al. |
| 5,113,104 A | 5/1992 | Blaettner et al. |

(Continued)

FOREIGN PATENT DOCUMENTS

| | | |
|---|---|---|
| DE | 1 538 875 A | 4/1970 |
| DE | 2016866 B | 2/1973 |

(Continued)

*Primary Examiner* — Burton Mullins
(74) *Attorney, Agent, or Firm* — Muncy, Geissler, Olds & Lowe, P.C.

(57) ABSTRACT

An electro-motor drive, in particular for a fan drive of a motor vehicle, includes a commutator motor, a motor shaft of which is rotatably mounted on axially opposite sides in shaft bearings facing away from the bearing shield in order to substantially dampen the sound of at least bearing play-related contact noise and vibration or humming noise.

18 Claims, 3 Drawing Sheets

(56) References Cited

U.S. PATENT DOCUMENTS

| | | |
|---|---|---|
| 5,360,274 A | 11/1994 | Strobl |
| 6,164,830 A | 12/2000 | Nitzsche et al. |
| 6,242,839 B1 * | 6/2001 | Cefo .............................. 310/233 |
| 6,283,726 B1 | 9/2001 | Fackelmann et al. |
| 6,707,177 B1 | 3/2004 | Campbell et al. |
| 6,849,976 B2 | 2/2005 | Yoon et al. |
| 2003/0062796 A1 | 4/2003 | Takahashi et al. |

FOREIGN PATENT DOCUMENTS

| | | |
|---|---|---|
| DE | 3145 601 A1 | 5/1983 |
| DE | 295 13 633 U1 | 10/1996 |
| DE | 199 09 507 C1 | 11/2000 |
| DE | 201 13 461 U1 | 6/2001 |
| EP | 0 182 145 A1 | 5/1986 |

* cited by examiner

ELECTRIC MOTOR DRIVE, IN PARTICULAR FAN DRIVE

This nonprovisional application is a continuation of U.S. application Ser. No. 13/163,237, which was filed on Jun. 17, 2011, which is a continuation of International Application No. PCT/DE2009/001777, which was filed on Dec. 16, 2009, and which claims priority to German Patent Application No. DE 10 2008 062 432.2, which was filed in Germany on Dec. 17, 2008, and which are all herein incorporated by reference.

BACKGROUND OF THE INVENTION

1. Field of the Invention

The invention concerns an electric motor drive with a commutator motor whose motor shaft is rotatably supported in shaft bearings on axially opposite sides.

2. Description of the Background Art

Known from EP 182 145 A1, which corresponds to U.S. Pat. No. 4,639,193, and from DE 199 09 507 C1, which corresponds to U.S. Pat. No. 6,283,726, are fans of a heating and air conditioning system of a motor vehicle with an electric-motor-driven fan rotor that is mounted on the motor shaft.

Furthermore, it is known from DE 295 13 633 U1 for the motor shaft to be rotatably supported in plain bearings implemented as spherical bearings, both on the brush system side (BS) where the commutator bars of the motor are located and on the opposing other side (AS). The spherical bearings in this design are pressed against an end plate by means of a clamping collar. On the BS side, a shaft section of the motor shaft, to which the fan rotor is attached by its central rotor hub, projects out of the end plate near the commutator. Such electric motor drives have an axial play of the motor shaft, and thus of the motor armature/impeller system, which frequently results in undesirable noises.

SUMMARY OF THE INVENTION

It is therefore an object of the invention is to improve an electric motor drive of the type mentioned at the outset with regard to the least possible noise generation.

To this end a damping system for sound damping is located on a bearing side, facing away from the end plate, of the shaft bearing on the BS-side and/or the shaft bearing on the AS-side. The damping system serves to reduce the sound level, especially of impact noises caused by bearing play, but also serves to damp so-called "ooo" sounds (whining noises), which are produced by operation-related disturbances at each rotation of the motor and associated resonance effects.

The invention is based on the idea that the operationally caused noises of such a fan drive are, on the one hand, impact noises that are caused by an axial excursion of the motor shaft and the impeller system placed thereon. On the other hand, the passage of the brushes over the commutator shaft additionally causes vibration noises, which are emitted through the motor housing. In this process, the noise generation inside the motor originates from the commutator through the shaft bearing and end plate to the motor housing.

This structure-borne sound, which can also be generated by the multi-spoke fan rotor and is transmitted to the motor housing, arises in a speed range of the electric or commutator motor that is correlated with the resonant frequencies of the overall system, in particular at resonant points specific to the housing parts. If the sound transmission path from the commutator on the one hand, and from the fan rotor on the other hand, through the shaft bearing to the motor housing can be eliminated or at least reduced, then the structure-borne sound can also be reduced accordingly.

On the other hand, impact noises resulting from axial excursion of the system parts coupled to one another by the motor shaft, namely the armature and the commutator of the motor, as well as those caused by the fan rotor of the fan, can be prevented or at least reduced if a suitable damping device is placed on the bearing side facing away from the end plate of the applicable shaft bearing in order to attenuate the bearing-play-related impact noises.

In addition to damping the impact noises that are prevented or reduced on the BS side by the damping system that is used, in practice, between the commutator and the shaft bearing there and that takes up the axial play, the vibrations generated by the interaction between the brushes and the commutator bars also are damped reliably by means of the damping system.

In a useful embodiment, the damping system has a sealing disk and a thrust washer with antifriction properties that is referred to below as a sliding disk. A spring travel is appropriately defined between the sealing disk and the sliding disk that usefully is in the range of tenths of a millimeter, and preferably is less than or equal to 0.2 mm. Located between the sealing disk and the sliding disk, a wave spring in the manner of a spring washer or a spring element, is located on the motor shaft. This wave spring contributes significantly, or even predominantly, to attenuating the whining or "ooo" sounds.

Suitably, the damping system has a damping element on the disk side of the sealing disk facing the shaft bearing. This damping element preferably is annular. In the assembled state of the sealing system, the wave spring is suitably disposed in an annular space formed between the damping element of the sealing disk and the motor shaft, so that the damping element surrounds the wave spring coaxially.

Moreover, the sealing system preferably also has a shaft seal between the sealing disk and the rotor shaft. To this end, the sealing disk, the damping element, and the shaft seal are preferably produced as a single piece from a two-component plastic in the injection molding process. The sealing disk in this design is made of a relatively hard material or substance, while the shaft seal, which in turn is a single piece therewith, is made of a relatively soft damping material. A thermoplastic elastomer is particularly suitable as the damping material.

The shaft seal, which like the damping element is annular or cylindrical in shape, is L-shaped in cross-section. An axial branch of the L, extending along the rotor shaft, of the corresponding cylindrical or jacket-like section of the shaft seal produces a reliable press fit of the sealing disk on the motor shaft. Adjoining this axial branch of the L, a radial branch of the L of the corresponding annular section of the shaft seal engages behind the sealing disk on the rear of the disk facing away from the shaft bearing. This radial branch of the L of the shaft seal and, where applicable, a number of damping points preferably implemented as arcs or segments of circles, which likewise are made of the comparatively soft damping material, also serve as damping elements of the damping system in its contact with the commutator.

In a useful development, the sealing disk and the sliding disk are slotted together. For this purpose, detent elements are suitably formed on the sealing disk, preferably three detent elements arranged to be offset by 120° with respect to one another. The detent elements are composed of detent webs that are oriented toward the sliding disk. Formed on the end sides of the detent webs, at a predetermined distance from the sealing disk or the damping element that is a single piece therewith, are detent cams, which engage behind the sliding disk in the slotted-together state. The spring travel between the sealing disk and the sliding disk that is available to the spring element is defined by the axial thickness of this sliding disk and by the distance of the detent cams from the damping element of the sealing disk.

Formed on the circumferential side of the sliding disk—again usefully offset by 120° with respect to one another—are outwardly projecting carrier elements or carrier cams. When the sliding disk is in the slotted state, these carrier elements produce an interlocking connection with the sealing disk in the appropriate direction of rotation of the motor or motor shaft as soon as the detent cams have traversed or passed through the distance, measuring e.g. 120° of arc, between two detent elements of the sealing disk, upon first startup.

It is useful for the mounting of the damping system on the motor shaft to be implemented as a press fit. In this design, the pressing force or adhesion of the sealing disk on the motor shaft is greater than that of the sliding disk. Just one reason for this is the fact that the sealing disk, in contrast to the sliding disk, is pressed onto the motor shaft via the elastically deformable damping material, which also permits an ability to move in an axial motion of the sealing disk on the motor shaft. This ability to move has the advantage that, during assembly, which is to say when the two disks are slotted together to join them into the damping system, at least the sealing disk can execute an axial motion along the motor shaft toward the sliding disk.

Subsequent to a first 120° relative rotation between the two disks, the interlocking connection is established between the detent webs of the sealing disk and the cams of the sliding disk, so that both disks and thus the entire damping system are firmly seated on the motor shaft and rotate therewith relative to the stationary shaft bearing or spherical bearing. In order to capture friction bearing oil thrown outward by the centrifugal force and return it to the bearing, the sealing disk is preferably designed in the manner of a dish with an oil splash collar facing inward at the circumference of the disk.

The thermoplastic elastomer that is suitably chosen as the material for the sliding disk, in particular a thermoplastic copolyester, has sliding friction properties that are especially suitable for the material pairing with the spherical bearing, which is typically made of steel.

The advantages achieved with the invention are, in particular, in the fact that the noises or sounds usually produced by axial shaft excursion on the one hand, and by the armature/impeller system and/or commutator/brush system on the other hand, are damped considerably, at least, by the use of a suitable damping system, preferably in both bearing locations of the motor shaft of an electric motor fan drive. As a result, the sound level of the structure-borne sound of the overall system, in particular including speed-dependent local sound levels in the range of the resonant frequencies of the housing or system parts, is reduced considerably over the speed range of the electric motor.

Due to the use of a clamping collar, known per se, which is inserted between the shaft bearing and the damping system, and which braces on the circumferential side against the end plate, the shaft bearing—which is usefully implemented as a spherical bearing—is pressed reliably towards the end plate opposite the damping system.

Further, the scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
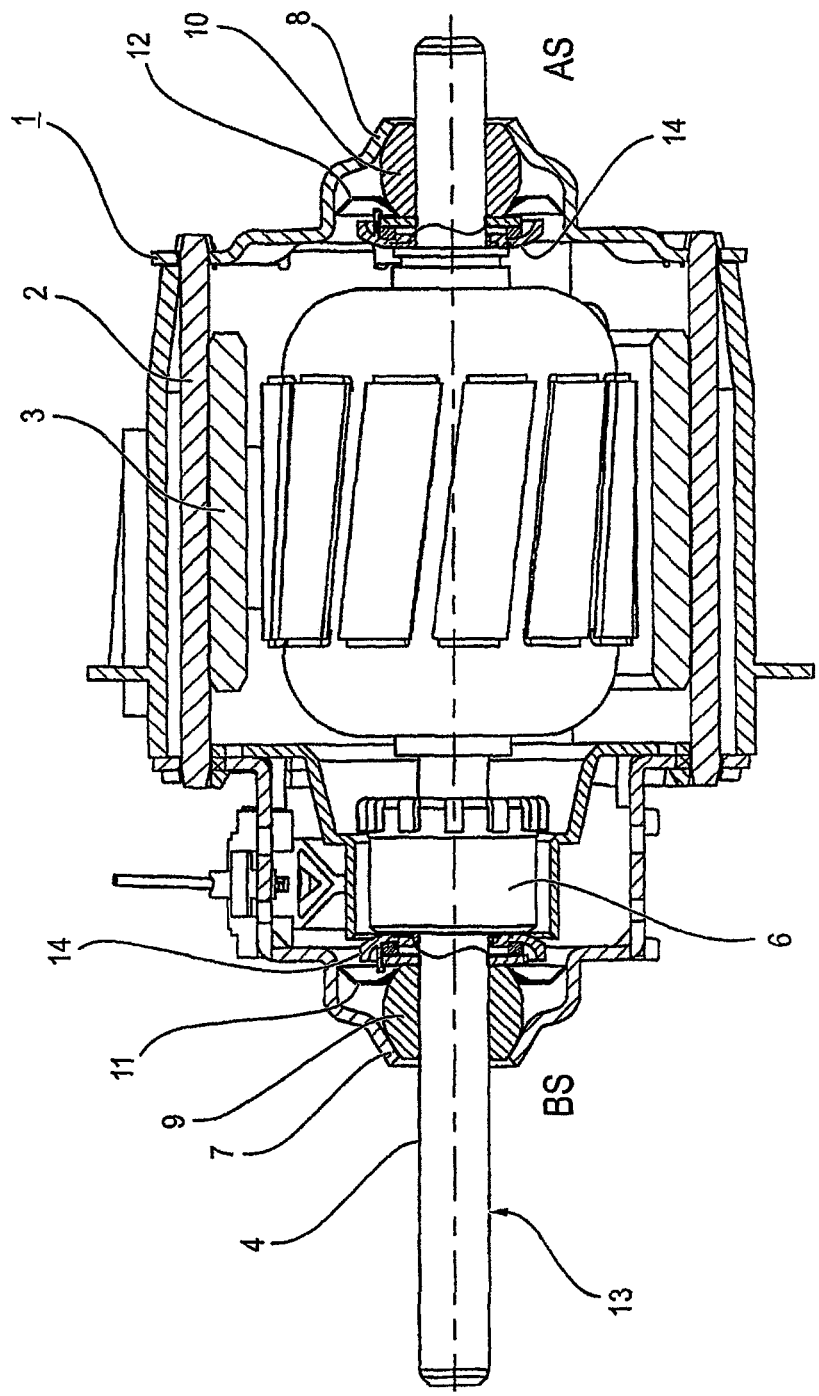
FIG. 1 is a partial longitudinal section of an electric motor drive for a heating and air conditioning fan in a motor vehicle with a brush-system-side spherical bearing and an opposing-side spherical bearing, with a damping system according to the invention.

Corresponding parts are labeled with the same reference characters in all the figures.

FIG. 1 shows an electric motor drive in the form of a commutator motor 1 with a motor housing (pole housing) 2, on whose inner circumference are held a number of curved field or permanent magnets 3 corresponding to the number of poles of the motor 1. In a manner that is not illustrated in detail, a motor shaft 4 bears the armature (rotor) 5 of the commutator motor 1, which is implemented as a rotor lamination stack with rotor windings wound therein. In a manner that is not illustrated in detail, a commutator 6, likewise mounted on the motor shaft 6, has commutator bars with bar connections that are connected to the rotor windings of the armature 5. The bars of the commutator 6 are contacted by brushes in a manner known per se. This side of the motor is frequently also called the brush side or brush system side, or abbreviated BS (BS side). The opposing side is labeled AS (AS side).

At these two sides BS and AS of the commutator motor 1, a brush-side end plate 7 is fastened to the motor housing 2 at the end of the motor closest to the commutator.

At the opposite shaft end of the motor shaft furthest from the commutator an end plate 8 is fastened on the AS-side to the motor housing 2. The two end plates 7, 8 accommodate spherical bearings 9 or 10 in which the motor shaft 4 is rotatably supported by means of an oil film. The two stationary spherical bearings 9, 10 are each pressed and clamped against the applicable end plate 7 or 8 by means of a clamping collar 11, 12. The clamping collar 11, 12 is braced against the applicable end plate 7 or 8 in this design.

The commutator-side shaft end of the motor shaft 4 projects on the BS side out of the end plate 7 with a sufficiently long shaft section 13 to accommodate a fan rotor of a heating and air conditioning fan of a motor vehicle in the manner known according to FIG. 1 of DE 295 13 633 U1, which is incorporated herein by reference the hub of which fan rotor is pressed onto this shaft section of the motor shaft 4 there. The commutator motor 1, which during the rotation thereof drives the fan rotor, thus serves as the fan drive.

Figure 2:
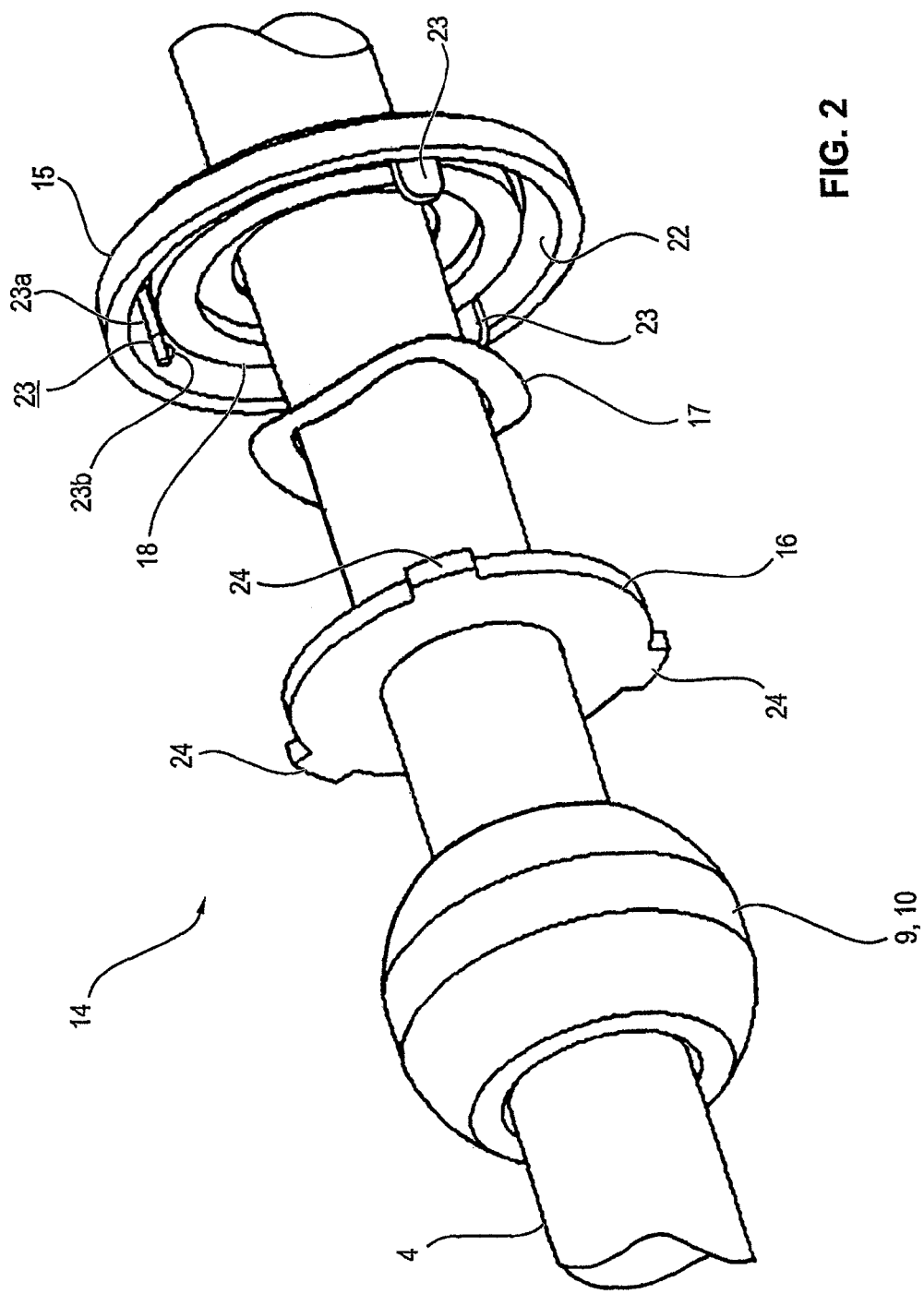
FIG. 2 is a perspective view of the inventive damping system in a preinstallation state with, arranged on the motor shaft, an annular sealing disk and a spring washer, as well as an annular sealing disk on the spherical bearing on the brush system side.
Figure 3:
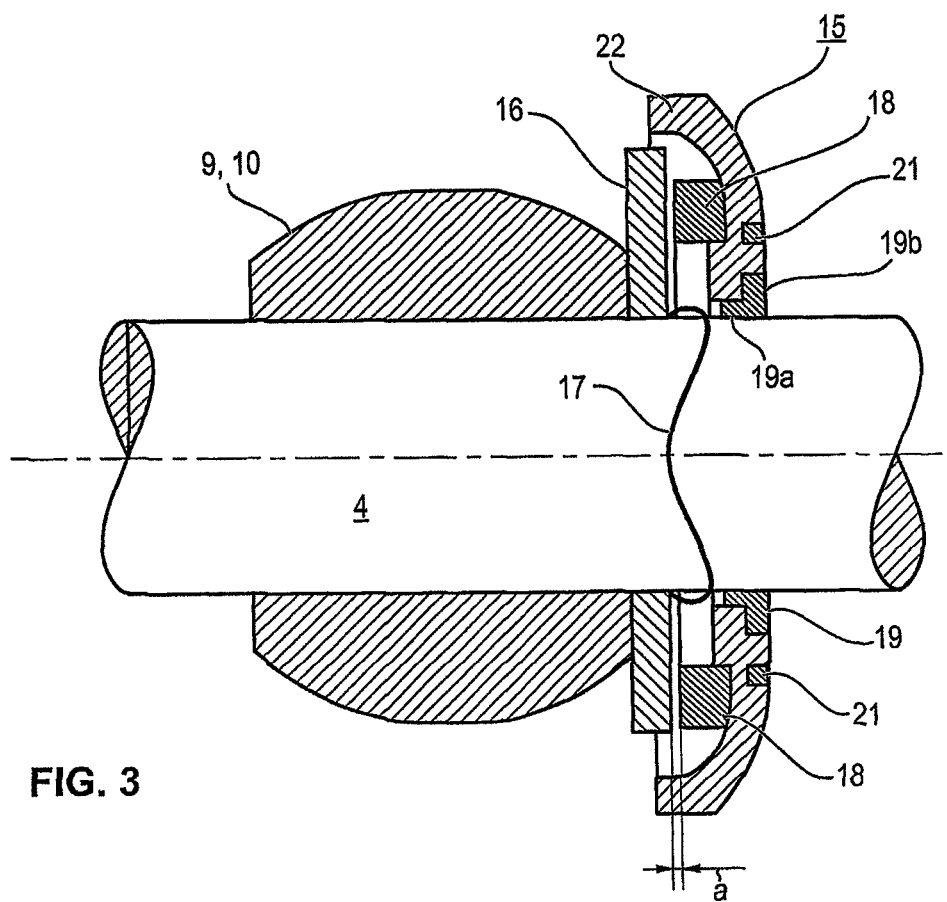
FIG. 3 is a longitudinal section of the damping system in contact with the spherical bearing in the assembled state with system disks slotted together to form defined spring travel.

As can be seen comparatively clearly from FIGS. 2 and 3, a damping system 14 preferably is provided on both the BS side bearing location and the AS side bearing location. This system is placed on the motor shaft 4 at the bearing side of the spherical bearing 9 or 10 facing away from the applicable end plate 7, 8. The damping system 14 takes up the axial play extending in the longitudinal direction of the motor shaft 4.

The damping system 14 serves, firstly, to attenuate impact noises that are caused by the axial excursion of the system composed of the armature 5 and commutator 6, including motor shaft 4, of which the fan rotor is also a part in the case of the fan drive. The damping system 14 thus reduces the sound level and also attenuates the noises that are known as "ooo" or whining noises generated by the commutator/brush system. The corresponding noise development is attributed to disturbances at each rotation of the motor that are caused by the relative motion of the commutator bars and the brushes traveling over them. In the relatively large plastic housing, these disturbances cause characteristic noises at resonant points specific to the housing parts.

As shown in FIGS. 2 and 3, the damping system 14 is composed primarily of a sealing disk 15 and a sliding disk 16, along with a wave spring 17 located between them. The sliding disk 16 faces the applicable spherical bearing 9, 10.

As can be seen relatively clearly in FIG. 3, a defined spring travel "a" is formed between the sealing disk 15 and the sliding disk 16. This travel is approximately 0.2 mm. In the assembled state of the damping system 14 that is shown, the wave spring 17, which like the sealing disk 15 and sliding disk 16 sits on the motor shaft 4, is located between these two disks 15 and 16. In this arrangement, a damping element 18, which is formed on the sealing disk 15 and made in an annular shape, coaxially surrounds the wave spring 17.

The damping element 18 preferably is a component of the sealing disk 15 that is made as a single piece therewith. The damping element 18 is made of a damping material that is relatively soft compared to the relatively hard material of the rest of the sealing disk 15. A shaft seal 19, which likewise is made of the damping material and again is made as a single piece with the rest of the sealing disk 16, grips around the motor shaft 4, and in so doing forms a cylindrical or sleeve-like seal transition to the sealing disk 15 on the motor shaft 4.

This shaft seal 19 is approximately L-shaped in cross-section, as shown in FIG. 3. In this design, an axial branch 19a of the L surrounds the motor shaft 4 in the transition region or opening region of the sealing disk 16, while an adjoining radial branch 19b of the L extends on the rear 20 of the sealing disk 15, engaging behind the disk there. The radial branch 19b of the L acts as contact damping of the damping system 13 with respect to the commutator 6.

Figure 4:
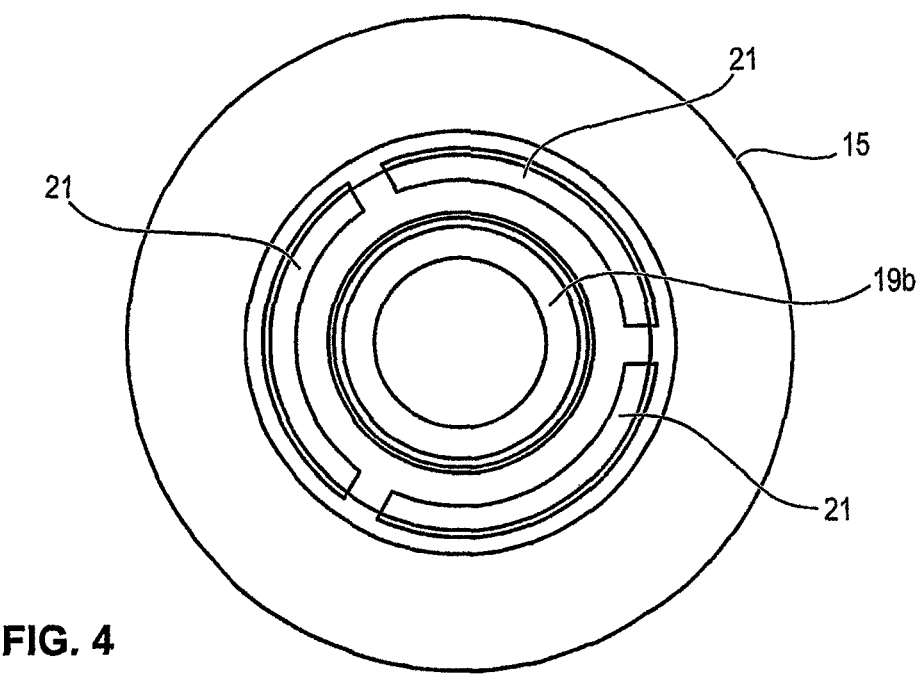
FIG. 4 is a view of the rear of the damping system facing the commutator of the electric motor drive.

This contact damping at the commutator 6 is supported by additional damping webs 21, which are visible in FIG. 4, which shows the rear 20 of the sealing disk 15. The damping webs 21 are likewise made of the comparatively soft damping material. As a result of the sealing disk 15 preferably being produced from a two-component plastic in the injection molding process, this material extends from the inner side of the sealing disk facing the sliding disk 16 to the opposite rear side 20 of the disk through local omissions of material.

The comparatively soft damping material forms the annular damping element 18 on the inner side as well as the shaft seal 19 and the three outer-side damping webs 21 of the sealing disk 15. In order to protect the commutator 6, this sealing disk is designed in a dish shape with an oil splash collar 22 for capturing friction bearing oil that is thrown outward for operational reasons.

As FIG. 2 shows, three detent elements 23 that are offset from one another by 120° in degrees of arc are formed on the sealing disk 15; each of these detent elements includes a detent web 23a with detent cam 23b molded on the end. When the sealing disk 15 and the sliding disk 16 are slotted together, these detent cams 23b, and hence the detent elements 23, engage behind the sliding disk 16. In this way, the sealing disk 15 that is pressed onto the motor shaft 4 is axially movable towards the sliding disk 16, which likewise is pressed onto the motor shaft 4 but is practically immovable, and the sealing disk is thus fixed in place thereon by the fact of being slotted together.

Formed on the sliding disk 16 are carrier cams 24, again offset by 120°. When the sealing disk 15 is slotted together with the sliding disk 16, these cams are each located in a random position between two of the three detent elements 23 of the sealing disk 15. As a result of the first motor actuation of the drive 1, the carrier cams 24 will make interlocking contact with the closest detent elements in the predetermined direction of rotation of the motor shaft 4 so that the damping system 14 is then established as a rigid disk structure with enclosed wave spring 17.

Since the damping system 14 rotates synchronously with the motor shaft 4, and hence also with the commutator 6, only contact or pressing effects need to be taken into account on the commutator side, whereas a relative motion between the damping system 14 and the stationary spherical bearing 9, 10 is present on the opposing bearing side for operational reasons. Consequently, sliding or friction effects must be taken into account there, so that it is advantageous for the sliding disk 16 to be made of a suitable sliding material or to be provided with suitable antifriction properties. For this purpose, a thermoplastic elastomer, such as a thermoplastic copolyester is especially suitable as a sliding disk material.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electric motor drive comprising:
    a commutator motor whose motor shaft is rotatably supported on axially opposite sides in a first shaft bearing and a second shaft bearing that are each covered by an end plate; and
    a first damping system for sound damping of bearing-play-related impact noises and operation-related whining noises is arranged on a side of the first shaft bearing opposite of the end plate of the first shaft bearing,
    wherein the first damping system has a sealing disk, which is axially movable on the motor shaft, a damping element, and a sliding disk that faces the first shaft bearing,
    wherein the sealing disk is fixed to the sliding disk, and
    wherein the damping element, the sealing disk and a shaft seal of the damping system are formed into a single piece.

2. The electric motor drive of claim 1, wherein the sliding disk comprises a plurality of carrier elements.

3. The electric motor drive of claim 2, wherein the plurality of carrier elements of the sliding disk comprises three evenly distributed carrier cams.

4. The electric motor drive of claim 3, wherein the three evenly distributed carrier cams are molded on the sliding disk.

5. The electric motor drive of claim 1, further comprising a second damping system located on the commutator motor.

6. The electric motor drive of claim 5, wherein the second damping system is arranged on the side of the second shaft bearing opposite of the end plate of the second shaft bearing,
wherein the second damping system has a second sealing disk, which is axially movable on the motor shaft, and a second sliding disk that faces the second shaft bearings, and
wherein the second sealing disk is fixed to the second sliding disk.

7. The electric motor drive of claim 5, wherein the first damping system and the second damping system are on opposite sides of the commutator motor.

8. The electric motor drive of claim 1, wherein the sealing disk is designed in a dish shape and comprises an oil splash collar.

9. The electric motor drive of claim 1, wherein the sliding disk is made of a thermoplastic elastomer.

10. The electric motor drive of claim 9, wherein the thermoplastic elastomer is a thermoplastic copolyester.

11. The electric motor drive of claim 1, wherein the sealing disk is fixed to the sliding disk by interlocking a carrier cam of the sliding disk with a closest dent element of the sealing disk.

12. The electric motor drive of claim 1, wherein the damping element is on the disk side of the sealing disk facing the first shaft bearing.

13. An electric motor drive comprising:
a commutator motor whose motor shaft is rotatably supported on axially opposite sides in a first shaft bearing and a second shaft bearing that are each covered by an end plate; and
a first damping system for sound damping of bearing-play-related impact noises and operation-related whining noises is arranged on a side of the first shaft bearing opposite of the end plate of the first shaft bearing,
wherein the damping system has a sealing disk, which is axially movable on the motor shaft, and a sliding disk that faces the first shaft bearing, and
wherein the sliding disk has, on a circumferential side, a plurality of carrier elements.

14. The electric motor drive of claim 13, further comprising a second damping system located on the commutator motor.

15. The electric motor drive of claim 14, wherein the first damping system and the second damping system are on opposite sides of the commutator motor.

16. The electric motor drive of claim 13, wherein the sealing disk comprises a dent web and a detent cam.

17. The electric motor drive of claim 13, wherein the damping system further comprises a damping element.

18. The electric motor drive of claim 13, wherein the plurality of carrier elements of the sliding disk comprises three evenly distributed molded on carrier cams.

* * * * *